United States Patent
Kilcoyne et al.

(10) Patent No.: US 8,762,516 B2
(45) Date of Patent: Jun. 24, 2014

(54) VERIFIABLE ONLINE USAGE MONITORING

(75) Inventors: Anthony Kilcoyne, Keighley (GB); William Douglas McCaughan, Knoxville, TN (US)

(73) Assignee: 4Everlearning Holdings Ltd., Cheshire (GB)

( * ) Notice: Subject to any disclaimer, the term of this patent is extended or adjusted under 35 U.S.C. 154(b) by 265 days.

(21) Appl. No.: 12/288,256

(22) Filed: Oct. 17, 2008

(65) Prior Publication Data

US 2009/0157873 A1  Jun. 18, 2009

Related U.S. Application Data

(60) Provisional application No. 60/981,685, filed on Feb. 6, 2008.

(51) Int. Cl.
  *G06F 15/16* (2006.01)
  *G06F 15/173* (2006.01)
  *G06F 3/048* (2013.01)

(52) U.S. Cl.
  USPC ........... 709/224; 709/200; 709/202; 709/204; 709/223; 715/802; 715/830

(58) Field of Classification Search
  USPC .......... 709/224, 200, 202, 204, 223; 715/802, 715/830
  See application file for complete search history.

(56) References Cited

U.S. PATENT DOCUMENTS 5,835,718 A * 11/1998 Blewett .......................... 709/218
5,864,852 A    1/1999 Luotonen
6,052,730 A    4/2000 Felciano et al.
2002/0019834 A1 * 2/2002 Vilcauskas et al. ........ 707/501.1
2003/0069962 A1 * 4/2003 Pandya .......................... 709/224
2004/0059782 A1 * 3/2004 Sivertsen ..................... 709/204
2004/0073644 A1 * 4/2004 Koch et al. ................... 709/223
2005/0060655 A1   3/2005 Gray et al.

(Continued)

FOREIGN PATENT DOCUMENTS

EP  0 801 487 A2  10/1997
GB  2 338 384 A   12/1999

(Continued)

OTHER PUBLICATIONS

"PCT Notification of Transmittal of the International Search Report and the Written Opinion of the International Searching Authority", dated Mar. 11, 2009, for PCT/GB2008/003504, 14pgs.

(Continued)

*Primary Examiner* — Rupal Dharia
*Assistant Examiner* — Mohammed Ahmed
(74) *Attorney, Agent, or Firm* — Buckley, Maschoff & Talwalkar LLC

(57) ABSTRACT

In the present invention, observed online CPD or CE activities must be within a designated envelope of acceptable behavior for accredited activity to be recorded in a session log for that user. When a watcher program detects one or more loss of user focus on the activity, it alerts the user and gives them a short opportunity to rectify the situation, otherwise a session timer is stopped and no further credits are added or verified to the user's session log. When a session is ended by a user or the watcher program, only the verified activity that can be accredited to CPD is itemised and catalogued cumulatively in the user's session log.

17 Claims, 2 Drawing Sheets

(56) References Cited

U.S. PATENT DOCUMENTS

| | | |
|---|---|---|
| 2005/0071745 A1* | 3/2005 | Ehrich et al. ............... 715/500.1 |
| 2005/0086610 A1* | 4/2005 | Mackinlay et al. ........... 715/817 |
| 2005/0120312 A1* | 6/2005 | Nguyen ....................... 715/863 |
| 2005/0192863 A1* | 9/2005 | Mohan ............................ 705/14 |
| 2005/0198589 A1* | 9/2005 | Heikes et al. ................ 715/805 |
| 2005/0268247 A1* | 12/2005 | Baneth .......................... 715/781 |
| 2006/0004911 A1* | 1/2006 | Becker et al. ................ 709/207 |
| 2006/0005142 A1* | 1/2006 | Karstens ....................... 715/767 |
| 2006/0218304 A1* | 9/2006 | Mukherjee et al. ........... 709/246 |
| 2007/0115845 A1* | 5/2007 | Hochwarth et al. .......... 370/252 |
| 2007/0226003 A1* | 9/2007 | Zapiec et al. ..................... 705/1 |
| 2007/0239528 A1* | 10/2007 | Xie et al. ......................... 705/14 |
| 2008/0071881 A1* | 3/2008 | Kronlund et al. ............. 709/217 |
| 2008/0177994 A1* | 7/2008 | Mayer ............................... 713/2 |
| 2008/0215670 A1* | 9/2008 | Redd et al. .................... 709/203 |
| 2008/0306794 A1* | 12/2008 | Cohen et al. ....................... 705/7 |
| 2011/0022984 A1* | 1/2011 | van der Meulen et al. ... 715/830 |

FOREIGN PATENT DOCUMENTS

| | | | | |
|---|---|---|---|---|
| WO | 01/20503 A1 | 3/2001 | | |
| WO | WO0120503 | * 3/2001 | ............. | G06F 17/60 |
| WO | 01/73724 A1 | 10/2001 | | |

OTHER PUBLICATIONS

"Patents Act 1977: Search Report under Section 17(5)", dated Sep. 26, 2008, for GB Application No. GB0720433.2, 4pgs.

Jason I. Hong et al., "WebQuilt: A Framework for Capturing and Visualizing the Web Experience", ACM, May 1-5, 2001, XP040124241, (pp. 717-724, 8 total pages).

Ling Guo et al., "Use Web Usage Mining to Assist Online E-Learning Assessment", Proceedings of the IEEE International Conference on Advanced Learning Technologies (ICAT'04), Aug. 30, 2004, XP010741212, ISBN: 978-0-7695-2181-7, 2pgs.

David Nicol et al., "Footsteps: Trail-blazing the Web", Computer Networks and ISDN Systems, vol. 27, No. 6, Apr. 1, 1995, XP004013190, ISSN: 0169-7552, (pp. 879-885, 7 total pages).

Stephan Jacobs et al., "Filling HTML forms simultaneously: CoWeb—architecture and functionality", Computer Networks and ISDN Systems, vol. 28, No. 11, May 1, 1996, XP004018236, ISSN: 0169-7552, (pp. 1385-1395, 11 total pages).

\* cited by examiner

VERIFIABLE ONLINE USAGE MONITORING

RELATED APPLICATIONS

This application is based on, and claims benefit of and priority to, U.S. Provisional Application Ser. No. 60/981,685, filed Oct. 22, 2007, and UK Patent Application No. 0720433.2 dated 18 Oct. 2007, the contents of which are incorporated by reference herein in their entirety.

FIELD OF THE INVENTION

The present invention relates to usage monitoring, and in particular the monitoring of computer usage for verifiable recording purposes.

BACKGROUND TO THE INVENTION

The use of personal computers (PCs) for leisure as well as for work and education poses problems for employers and supervisors wishing to monitor PC usage. Whilst many employees and students can be trusted to use their PC appropriately, some cannot. Also, the ease with which PC users can switch between work and education to leisure usage means that even well meaning users can easily become distracted from the task in hand.

PCs typically run multiple applications simultaneously and so, for example, a professional user such as a patent attorney learning online as part of a continuing professional development (CPD) or continuing education (CE) programme will probably also have their personal e-mail and other applications running on the PC at that time. CPD programmes typically require the professional to log their CPD activity units and classify these according to the development tasks carried out. Monitoring CPD activity can be achieved easily in the case of attendance at a course or lecture series, for example, but monitoring online learning activities is a greater challenge. Not only does this rely on the honesty of the professional but also upon the ability of even honest professionals to record their activities accurately.

The above is one of many examples where monitoring of computer usage is of paramount importance. Other examples include monitoring of employee computer activity in the workplace. Whilst spyware and other malicious software have shown tracking a user's every action to be technologically achievable, security issues, privacy, and ethics hinder observing a user's actions beyond one's own website. Therefore, whilst monitoring usage of locally stored pages by an application is relatively easy, the application cannot be used to monitor usage of external web pages. Often local pages have links to external websites and so accurate usage monitoring can be a real problem.

There is therefore a need in the art for an application which can accurately monitor computer usage, and in particular usage of external web pages.

SUMMARY OF THE INVENTION

According to the present invention there is provided a method and system for monitoring computer usage of external web pages for the purpose of recording verified user activity.

Preferably, the invention includes the retrieval of an external web page, caching this in an application server, updating one or more links to refer to the application domain and presenting this page to a user. When the user clicks a link the application server will request and cache the external domain but since the link will have been proxied through the application domain, the request and time spent on the page can be recorded. The user is presented with the same content as they would when visiting the external website directly. In this way, external pages can be monitored since, as is the case for local pages, all requests are via the application domain. A watcher program is launched to monitor the user's subsequent activity to ensure that only those activities within a designated envelope of accredited behaviour are recorded.

BRIEF DESCRIPTION OF THE DRAWING

A preferred embodiment of the present invention will now be described in detail with reference to the accompanying drawings, in which.

DETAILED DESCRIPTION

Figure 1:
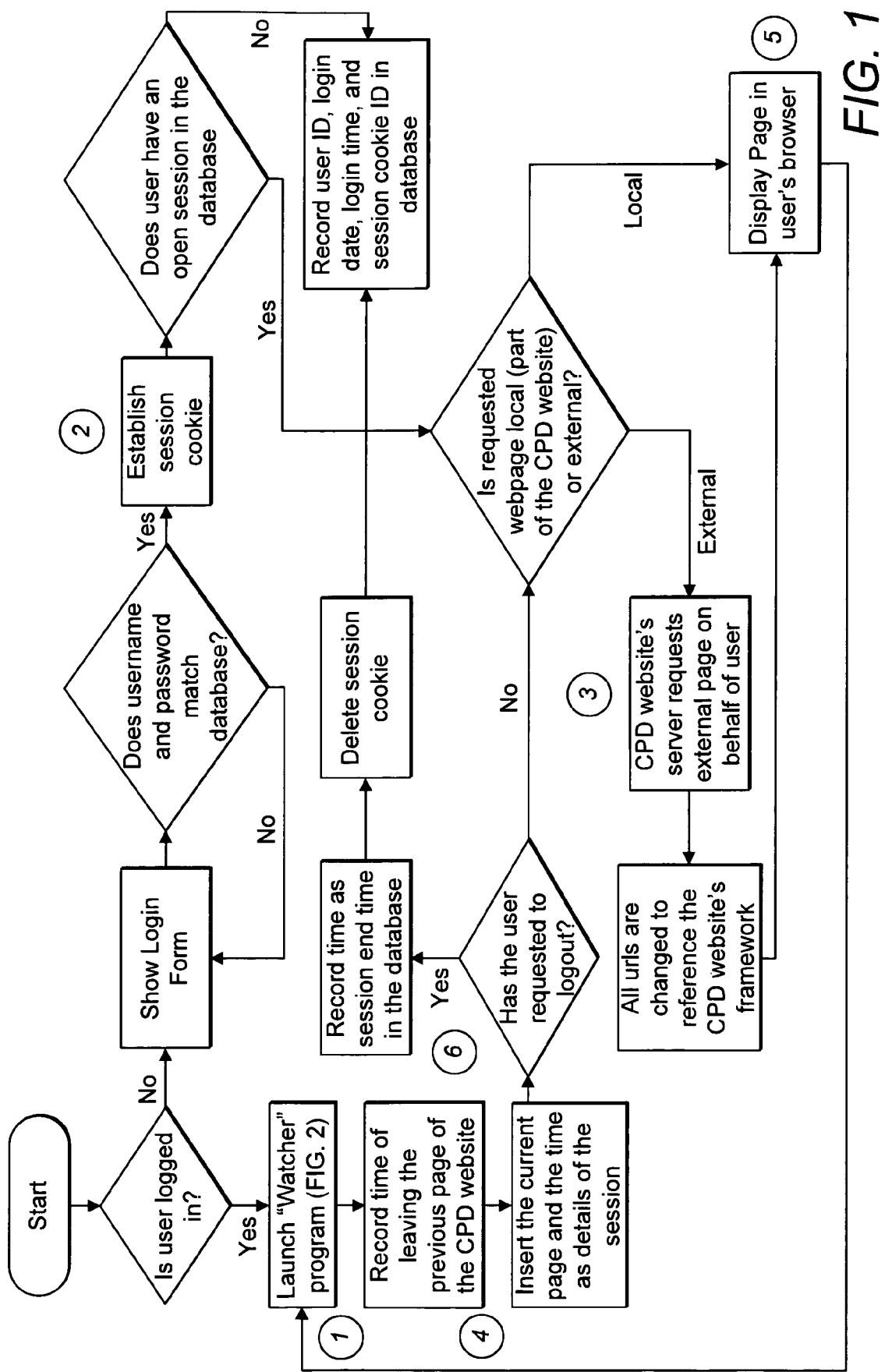
FIG. 1 shows a simplified flow diagram of verified online session tracking and usage monitoring; and, FIG. 2 shows a simplified flow diagram of a watcher program which prevents cheating by the user.
Figure 2:
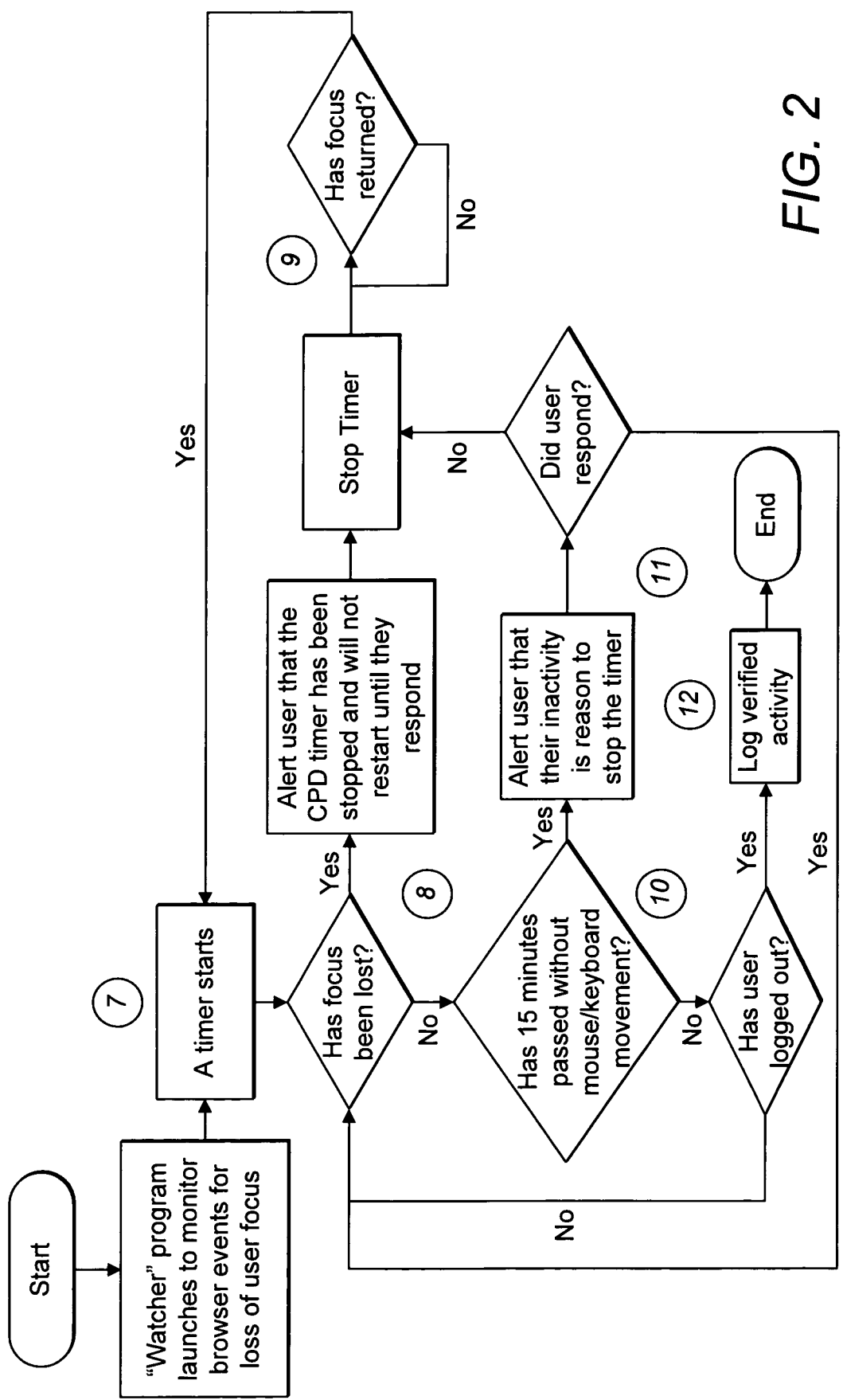

With reference to FIGS. 1 and 2, the preferred implementation of the present invention will now be described in detail. The preferred implementation is based upon continuing professional development (CPD) (or continuing education (CE) as it is known in some countries) for patent attorneys. However, it will be apparent that the present invention has broader application to usage monitoring of professionals and non-professionals in a host of other tasks.

At least a proportion of a patent attorney's CPD typically has to be verified. Verified CPD may include attendance at seminars, courses etc. where the attendance of the patent attorney can be confirmed by signature or stamp, for example. The remainder of the CPD may be unverified but this brings about issues concerning the accuracy and validity of the claimed time spent performing various CPD tasks. With tutorials and the like being more commonly available online, patent attorneys are increasingly spending more time learning for qualifying CPD hours at their PCs.

Online CPD for patent attorneys includes a website which offers patent attorneys the opportunity to earn CPD credits for every 15 minutes of time spent learning online and logged-in with that website. The organisation behind the website has the responsibility of helping to keep honest people honest by making sure time is only tracked when the user is actually using the website.

With reference to the flow diagram of FIG. 1, session tracking using a web application embodying the present invention on the CPD website will now be described. Users must first register with the CPD website to gain username and password details prior to session initiation.

A new or returning user logs into the site (1) by inputting member username and password details. If these are incorrect then they must be input again.

Once logged in, the web application establishes a session by placing a cookie (2) on the user's computer which stores a unique identifier. This session cookie may be logged in a web application database for the session.

The Internet is a "stateless" environment, which means that once a browser gets a piece of information from a server that server holds no record of the client browser immediately following the handover of the requested information. Cookies with unique identifiers are a commonly accepted approach to simulating a "state" and being able to associate server data with a client computer.

With a session cookie established, a check is made to verify whether that user has an open session logged in the database. If not then the username, login date and time and the session cookie id is logged in the database. If a session is already open then the existing session is continued and no new session is logged in the database.

Once a session has been established, the web application can now observe the patent attorney's path through the CPD website. Pages relevant to the patent attorney's profession development can be local (i.e. stored in the CPD website's domain) or external (i.e. other websites).

To solve the above mentioned privacy, security and ethical issues associated with monitoring external web pages without resorting to spyware and other malicious software, the web application is operable to retrieve external websites on behalf of the patent attorney and present the information to the patent attorney. The web application emulates a web browser within its own website and presents the external website's content in whole and unaltered, as will be explained in more detail below.

Use of local pages may be easily tracked since all requests go through the CPD website's domain. The present invention also makes it possible to track use of external pages, since that content is presented within the CPD website's domain. This is of great advantage since it then becomes possible to precisely track the time the patent attorney spends studying for CPD credits using both local and external sources.

If the user requests an external web page then the web application server requests the external page on behalf of the user. The server caches the external website (3) then, unbeknownst to the user, updates all links to refer to the CPD website's domain just before presenting it to the user (5) in the user's browser.

When the user clicks a link, the CPD website's server will request and cache the external domain but since the link will have been proxied through the CPD website domain, the request and time spent on the page can be recorded (4). As for presentation (5), the user sees nothing different than having visited the external website directly.

If the user requests a local page then this is presented (5) in their browser in a conventional manner.

When a local or external page that has been viewed is closed by the user the time of leaving the page is recorded (4). Details of the page and the time are added to the database as details of the current session. If the user has requested to log out of the web application then the time is recorded as the end of session time in the database and the current session cookie is deleted. Otherwise, the application waits for the next request for a page to be displayed.

A history of the patent attorney's clicks and actions within the CPD web application is permanently recorded (6) so that time can be apportioned to specific categories of CPD in dependence on the content of the viewed pages.

As shown in FIG. 2, the web application helps patent attorneys keep their CPD time tracking as accurate as possible through a "watcher" program that monitors the focus of the patent attorney. This programming helps prevent a patent attorney from earning CPD time while doing unrelated activities on their computer and assists accurate recording and makes true CPD time verifiable.

When a session is initially established (FIG. 1), the CPD web application launches the watcher program (FIG. 2) to make sure that the patent attorney is neither idle nor has their focus outside of the CPD website. To earn CPD time, the patent attorney must have the computer's focus on the web browser and specifically on the CPD website with no lengthy inactivity. In other words, only activities that fall within a designated envelope of acceptable behaviour are recorded for accreditation purposes.

The watcher program is capable of monitoring mouse and keyboard activity, general browser activity, the opening and use of other unrelated applications, and any other activity which might suggest a loss of foci. The observed activities must be within a designated envelope of acceptable behaviour for verified CPD activity to be recorded in the session log for that user. When the watcher program detects one or more loss of foci, it alerts the user and gives them a short opportunity to rectify the situation, otherwise the timer is stopped and no further credits are added or verified to the user's session log. When a session is ended by a user or the watcher program, only the verified activity that can be accredited to CPD is itemised and catalogued cumulatively in the user's session log (12).

As shown in FIG. 2, the watcher program starts a timer as soon as the session is initiated. The timer (7) is run through a loop which confirms that the browser window and tab displaying the web page remains the focus for the user. If at any time the user logs out, the timer will stop.

If the focus is lost (8), because a new window or tab has been opened or activated on the user's PC, for example, the timer is stopped (9) and an alert is displayed on the PC screen to inform the user that the CPD timer has stopped and will not restart until the focus returns.

In this example, the watcher program also confirms that within a given 15 minute time period that the user has moved the mouse or typed on the keyboard. If no activity is detected (10), the user is prompted to confirm they are at the keyboard and reading. If the user responds as instructed, the timer continues. If the user does not give the required response (11) the timer is stopped and an alert is displayed on the PC screen to inform the user that the CPD timer has stopped due to the inactivity until the user responds as instructed.

The watcher program is a dynamic computational entity that simultaneously cross-references various criteria in real-time via cookies, executable code and discriminatory algorithms. It has good specificity and sensitivity, and flags, collates, verifies and separates the pages visited into an individual's session log, whilst confirming timings, interactivity and focus on the different approved pages in real-time. The watcher program can utilise cookies, Java, HTML, browser plug-ins, directly executable applications and other executable content during its dynamic execution.

The watcher program can be accessed by the user in a number of ways, including:
  as a permanent program downloaded and stored on the user's computer/mobile device.
  downloaded at the start of each session into the temporary memory/cache of the user's computer/mobile device.
  remotely accessed for that session only via a proxy server and/or third party device.

The invention claimed is:

1. A method of monitoring and verifying online computer usage, comprising:
  running a parent web application on a client machine, the parent web application being in communication with a web server;
  upon receipt of a user request for an external web resource, retrieving and caching the requested web resource at the web server;
  updating one or more addresses in the cached web resource so that each refers to the parent web application's domain;

displaying the updated version of the requested web resource in an embedded browser of the parent web application;

monitoring, by a watcher program, the user's focus on the browser;

starting a timer by the watcher program when monitoring the user's focus on the browser, the user's focus being on the browser and inactivity with other applications;

recording in a session log, in an instance the user is considered to be focused on the browser, usage of the requested web resource that complies with terms of a predetermined envelope of approved usage, the usage comprising the time spent actively interacting with the requested web resource, wherein the actively interacting with the requested web resource comprises providing a user input or moving an associated user computing device;

communicating, when user inactivity indicates a lack of user focus, an alert to the user that the timer is stopped until the user's focus is returned to the browser; and communicating, when user inactivity indicates a lack of interactivity with the browser, an alert to user that the timer will stop without user confirmation of interactivity with the browser.

2. A method according to claim 1, wherein the watcher program is adapted to terminate the session log in an instance the user's foci does not comply with the terms of the predetermined envelope of approved usage.

3. A method according to claim 1, wherein the user's focus is monitored by detecting a manual input to a peripheral device of the client machine.

4. A method according to claim 1, wherein the user's focus is monitored by detecting browser activity on the client machine.

5. A method according to claim 1, wherein the user's focus is monitored by detecting the use of software applications on the client machine.

6. A method according to claim 1, wherein the session log records usage for the purposes of verified online continuing professional development submissions.

7. A method according to claim 1, wherein the external web resource is user requested by activating a link in a previously requested external web resource displayed in the browser, the link being proxied through the web application's domain.

8. A method according to claim 1, wherein the web server stores local resources for display in the parent web application upon request.

9. A method according to claim 8, wherein usage of the parent web application is monitored for requests for both external web resources and local resources.

10. A non-transitory computer readable medium storing executable instructions for performing the method of claim 1.

11. A method of recording the use of an online continuing professional development (CPD) resource, the method comprising:

displaying a web-based CPD resource in a browser;

monitoring, by a watcher program, the user's focus on the browser;

starting a timer by the watcher program when monitoring the user's focus on the browser, the user's focus being on the browser and inactivity with other applications;

recording in a session log, in an instance the user is considered to be focused on the browser, usage of the web-based CPD resource that complies with terms of a predetermined envelope of accredited usage of the CPD resource, the usage comprising the time spent actively interacting with the requested web resource, wherein the actively interacting with the requested web resource comprises providing a user input or moving an associated user computing device;

communicating, when user inactivity indicates a lack of user focus, an alert to the user that the timer is stopped until the user's focus is returned to the browser; and communicating, when user inactivity indicates a lack of interactivity with the browser, an alert to user that the timer will stop without user confirmation of interactivity with the browser.

12. A method according to claim 11, wherein the session log is terminated in an instance the user's foci does not comply with the terms of the predetermined envelope of accredited usage.

13. A method according to claim 11, wherein the user's focus is monitored by detecting a manual input to a peripheral device of the client machine.

14. A method according to claim 11, wherein the user's focus is monitored by detecting browser activity on the client machine.

15. A method according to claim 11, wherein the user's focus is monitored by detecting the use of software applications on the client machine.

16. A method according to claim 1, wherein the predetermined envelope of approved usage includes non-idle active usage and usage focused on the browser.

17. A method according to claim 11, wherein the terms of the predetermined envelope of approved usage includes non-idle active usage.

* * * * *